May 20, 1924.

J. L. KIMBALL 1,495,079

PRESSURE CONTROL APPARATUS

Filed April 2, 1923    4 Sheets-Sheet 1

INVENTOR.

James L. Kimball

Patented May 20, 1924.

1,495,079

UNITED STATES PATENT OFFICE.

JAMES L. KIMBALL, OF SALEM, MASSACHUSETTS, ASSIGNOR TO RUGGLES-KLINGE-MANN MFG. CO., OF SALEM, MASSACHUSETTS, A CORPORATION OF MASSACHUSETTS.

PRESSURE-CONTROL APPARATUS.

Application filed April 2, 1923. Serial No. 629,500.

*To all whom it may concern:*

Be it known that I, JAMES LEWIS KIMBALL, a citizen of the United States, residing at 9 Dearborn Street, Salem, in the county of Essex and State of Massachusetts, have invented certain new and useful Improvements in Pressure-Control Apparatus, of which the following is a specification.

This invention relates to pressure control apparatus of the hydraulically operated class, in which two fluid pressure motors operated from an independent pressure supply, is controlled from variations in pressure in a pressure system acting on a single flexible diaphragm.

The object of my invention is to provide means whereby the operation of one of said fluid pressure motors may be advanced a certain amount according to adjustment over the other motor, and to maintain this advance on an upward stroke but to follow the other motor on a downward stroke.

Another object is to provide means whereby one motor may start with a certain advance but increase its lead on the upward stroke and decrease its lead on the downward stroke.

Such apparatus is for general application to the control of pressures, but more particularly for the control of fuel and air supply to steam generating boilers from the pressure generated in said boilers.

In the control of fuel and air supply to steam generating boilers, and especially when powdered coal or fuel oil is used, it is desirable to advance the air supply a certain amount over fuel supply on an increased demand for steam, and to close off fuel supply in advance of closing off air supply on a decreased steam demand, the object being to always maintain an excess rather than a deficiency of air to burn the fuel and to increase the efficiency of combustion, and as an aid to preventing an excess amount of smoke.

I am aware of the fact that the art discloses pressure control apparatus having two fluid pressure motors operated from a single pressure device, (reference being had to Locke 724481 of April 7, 1903; also Preer 61303 of Oct. 25, 1898,) but only one of these motors discloses compensating action, and the second motor operates only after the first motor has completed its entire stroke. In my invention both motors operate at the same time, one motor maintaining its advance over the other, or may be adjusted to increase or decrease its advance in relation to the other.

Figure 1:
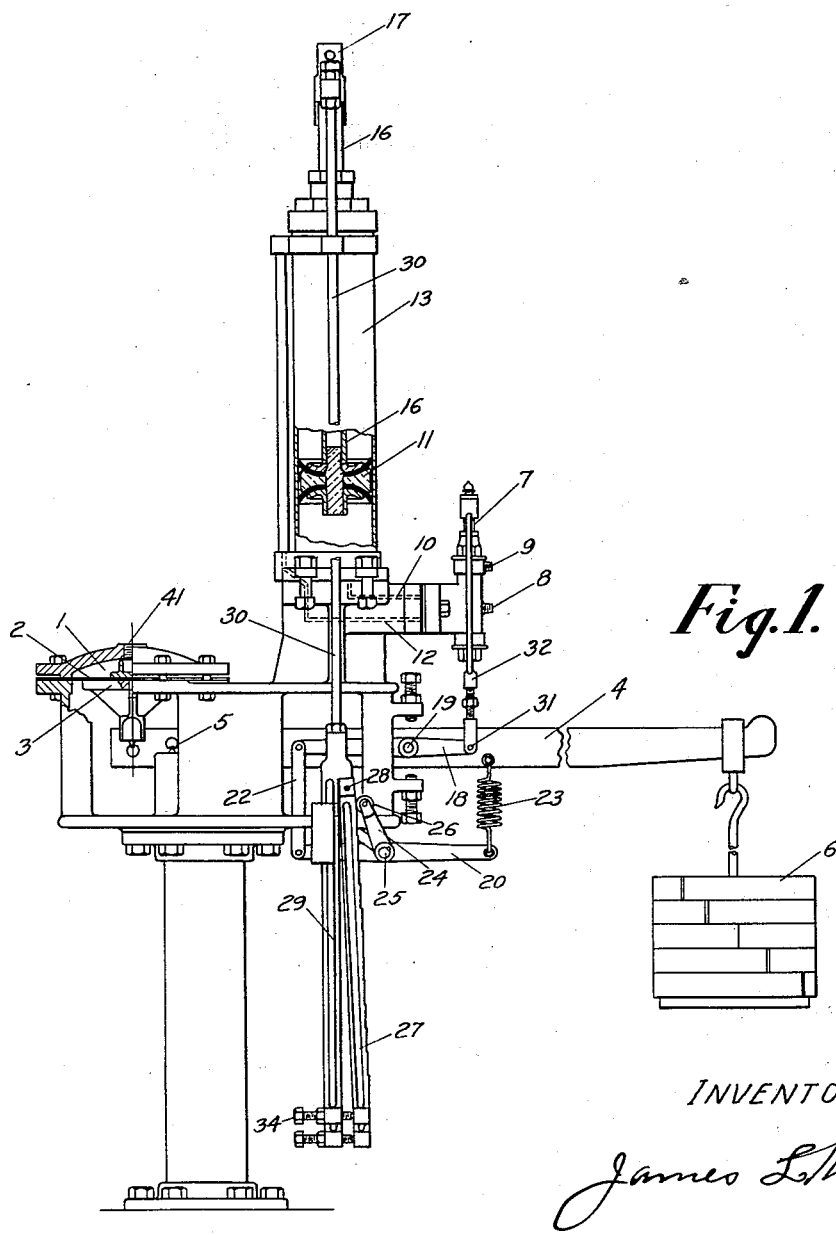
Figure 2:
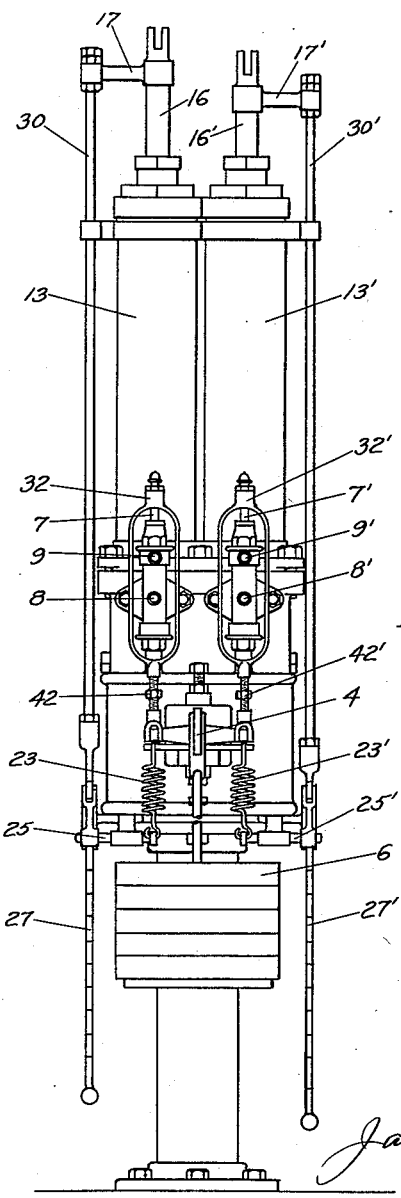
Figure 3:
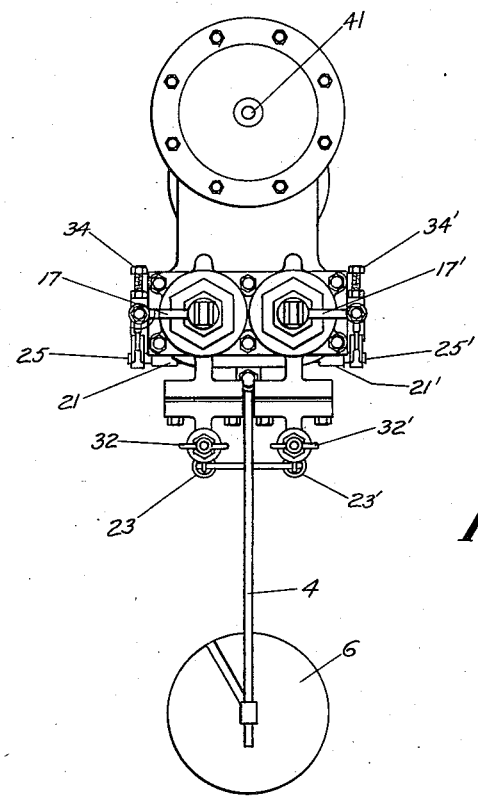

Referring to the drawings, Figure 1 shows a side vertical elevation, a part of which is in section. Figure 2 shows an end view of Figure 1. Figure 3 shows a plan view and Figure 4 the valve controlling and compensating arrangement, which is the same for each fluid pressure motor.

Figure 4:
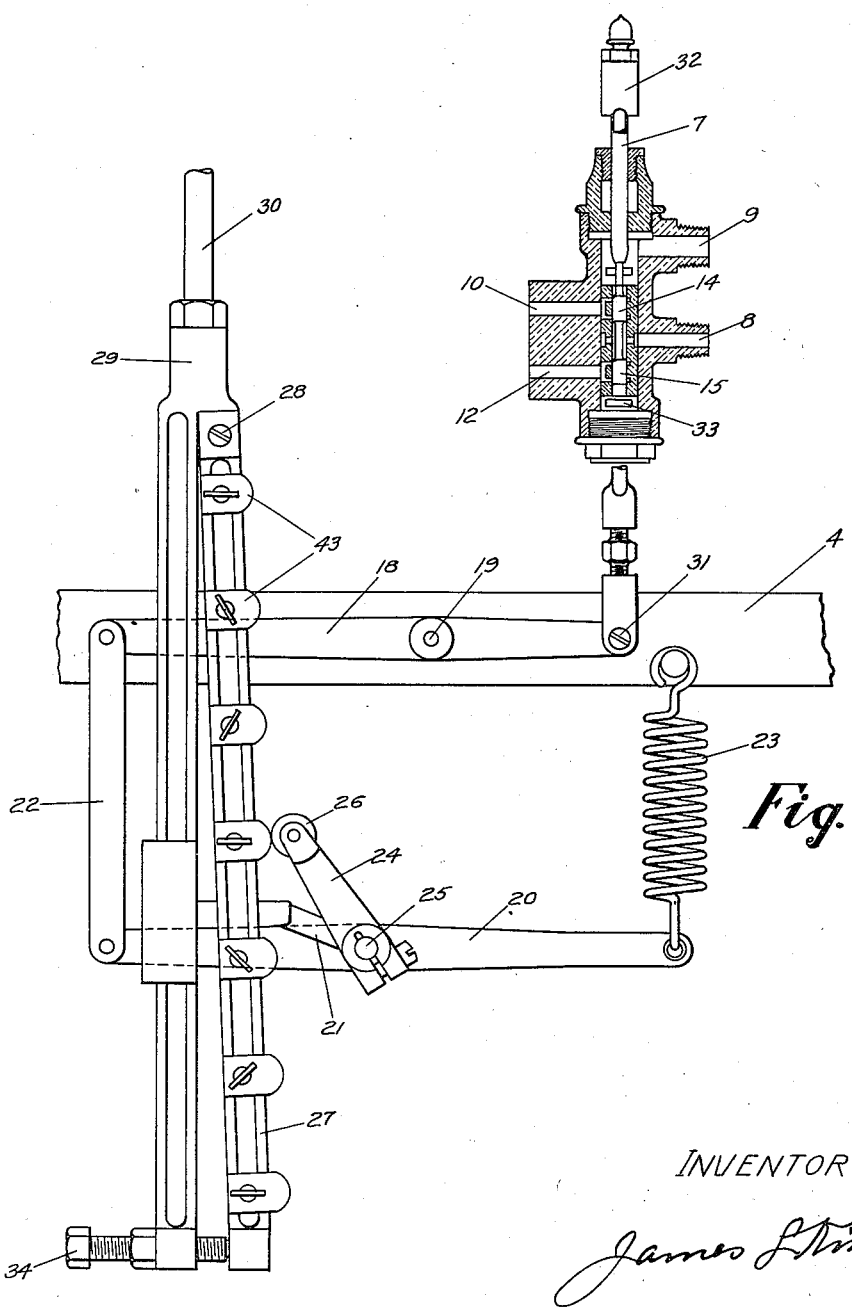

In Figure 1 (1) is a pressure chamber which is closed by a flexible diaphragm (2). A pressure cap (3) is mounted on the atmospheric sides of the diaphragm and engages a valve operating member (4), the valve operating member being fulcrumed at (5). Weights (6) are placed on the valve operating member to counteract the predetermined pressure to be maintained in chamber (1). The above elements constitute a preferred embodiment of a pressure device for operating pressure controlling valves (7). Referring to Figure 4, a preferred embodiment of a pressure controlling valve is shown in section. The inlet for fluid pressure is at (8) and the exhaust at (9). Port (10) leads to the bottom of motor piston (11), and port (12) to the top of motor cylinder (13) above piston (11). The controlling valve (7) has cylindrical portions (14) and (15), which control the admission and exhaust of fluid pressure to and from the motor cylinder (13). Piston (11) has piston rod (16) extending through the top cap of the motor and connecting member (17) is secured to the top of piston rod (16) and provides means for operating a damper or other controlling device. A member (18) is pivoted to the valve operating member (4) at point (19) and is arranged to be rocked by member (20), which has a stationary support (21), a connection (22) being made between the left hand end of members (18) and (20). The opposite end of member (20) is connected to valve operating member (4) by means of a spiral spring (23). Arm (24) is secured to shaft (25) and has a roll (26) at its upper end. Roll (26) is held in engagement with the adjustable step member (27) by means of spring (23). The adjustable step member is hinged at (28) to member (29). Member (29) has a rod (30) which connects with piston rod top (17). It will be seen that members (27) and (29) are connected to and travel up and down with the piston (11).

It will be understood that any variation in pressure chamber (1) above or below a predetermined value will impart motion to the valve operating member (4), and as member (18) is pivoted to member (4) at point (19) and the right hand end of this member connected at (31) with valve yoke (32) and its left hand end being held temporarily stationary, that such variation in pressure will operate valve (7) to a pressure position which will admit fluid pressure to the motor cylinder (13). Assuming an increase in pressure in chamber (1), the controlling valve would admit pressure to the under side of piston (11) through port (10) and at the same time vent the upper side to exhaust connection, while a decrease in pressure will admit fluid pressure to the top of motor cylinder and vent the bottom to exhaust. It will be understood that the exhaust from top of motor cylinder is to the bottom chamber of the controlling valve and is connected to the exhaust connection through cored passage (33). It will be seen that an increase in pressure will operate piston (11) in an upward direction and a decrease in pressure will operate piston (11) in a downward direction.

It will also be seen that both right and left hand controlling valves being connected to one operating member (4), that any variation in pressure in chamber (1) will operate these valves simultaneously and impart motion to pistons of both the right and left hand fluid pressure motors. As pointed out in the statement of invention, it is desirable to advance one fluid pressure motor a certain amount over the other fluid pressure motor, and for this reason I have provided adjustments (42) which allows one of the valve pistons (11) to be opened slightly in advance of the other valve piston. In this way one of the fluid pressure motors may be advanced one or more steps ahead of the other fluid pressure motor.

One of the objects of this invention being to effect a stoppage of the piston (11) at predetermined points in its travel, I have arranged a novel adjustable stepped wedge consisting of members (27) and (29), which travel with the motor piston (11) and impart motion at each step to rock the members (18) and (20), which effects a movement of the controlling valve independent of the pressure device. The movement imparted to the controlling valve for movement of piston (11) is always in the direction to return the controlling valve to a neutral or non-effective position at each step on member (27). Assuming an increase in pressure in chamber (1), the controlling valve upper port (10) is opened to pressure and lower port (12) to exhaust, which gives an upward motion to piston (11), which motion places roll (26) on a higher stepped position on the member (27), which gives the necessary motion to rock members (18) and (20) to return the valve (7) to a neutral or non-effective position. In the same way, on a decrease in pressure in chamber (1), the lower port (12) is opened to pressure and upper port (10) to exhaust, which gives a downward motion to piston (11) and places roll (26) on a lower stepped position, which rocks members (18) and (20) to give an upward motion to valve (7), which places it in a neutral or non-effective position and again brings piston (11) to rest.

It will be seen that I have devised novel means for effecting a cut-off at predetermined points in the travel of the piston (11). It is also found desirable under certain conditions to vary the position of the cut-off point so as to compensate for any variable characteristics in the control of either motor. While Figure 1 shows a compensating wedge (27) having evenly spaced steps, it is sometimes found desirable to supply adjustable steps, such as (43) shown in Figure 4. These steps may be adjusted so as to give a much greater travel on the first upward movement of the piston (11) than on the final part of the closing. Take it in the case of a damper control, it will be understood that the first part of the closing movement of the damper has very little effect in checking the draft. It is the final closing movement that is the most effective, and the same applies to the control of a steam throttling valve. These also have variable flow characteristics, which must be compensated for by variable increments of control.

It will be seen by those skilled in the art that I have devised a novel and useful means for compensating the action of two fluid pressure motors to effect a step by step movement of each motor, to control the action of such motors from single pressure device, and that I have also arranged novel means for advancing movement of one of said motors in advance of the other motor. It will also be seen that I have arranged novel means whereby the operation of each valve is independently governed from the fluid pressure motor which it controls. In accordance with provisions of Patent Statutes I have described the principle of operation of my invention, together with the apparatus which I now consider to represent the best embodiment thereof, but I desire to have it understood that the apparatus shown is only illustrative and is capable of various modifications and that only such limitations shall be imposed as are indicated in the appended claims.

1. In a pressure regulator comprising a pressure responsive device and a plurality of motors for controlling the pressure, controlling elements for each of said motors, means operated by the pressure responsive device for controlling the operation of the controlling elements, and adjustable means to vary the operation of said motors in relation to each other.

2. In a pressure regulator including a control chamber, two operating cylinders, a piston and piston rod mounted in said cylinders, independent valves controlling the admission of fluid pressure to said cylinders, and means whereby the operation of each valve is independently governed by the piston rod.

3. In a pressure regulator having a control chamber with a diaphragm which is subjected to a pressure to be regulated, two operating cylinders, a piston and piston rod mounted in said cylinders, independent valves controlling the admission of fluid pressure to said cylinders from variations in pressure on said diaphragm, and means whereby the operation of each valve is independently governed by the piston rod.

4. In a device of the character described, in combination with two fluid pressure motors of a pressure device and two controlling valves for operating said motors, an operating member for said valves, means for connecting said operating member with said valves, and means for adjusting said connections for advancing the movement of one of said motors a predetermined amount over the other motor.

5. In combination with two fluid pressure motors of a pressure device and two controlling valves for operating said motors, an operating member for said valves, means connecting said valves with said operating member, and means co-acting between the first named means and the fluid pressure motors for shifting the controlling valves to a non-effective position upon the motors commencing to act, and an adjustable means for advancing the movement of one of said motors a predetermined amount over the other motor.

6. In a pressure regulator comprising a pressure responsive device and a plurality of motors for controlling the pressure, controlling elements for each of said motors, means operated by the pressure responsive device for controlling the operation of the controlling elements, and means operated by each of said motors for rendering its respective controlling element inoperative and to cause a further operation of the pressure responsive device for a further operation of said motor.

7. In a pressure regulator comprising a pressure responsive device and a plurality of motors for controlling the pressure, controlling elements for each of said motors, means operated by the pressure responsive device for controlling the operation of the controlling elements, and step by step compensating means operated by each of said motors for abruptly rendering its respective controlling element inoperative at each stepped position, and to cause a further operation of the pressure responsive device for a further operation of said motor.

8. In a pressure regulator comprising a pressure responsive device and a plurality of motors for controlling the pressure, controlling elements for each of said motors, means operated by the pressure responsive device for controlling the operation of the controlling elements, and an adjustable compensator operated by each of said motors for rendering its respective controlling element inoperative and to cause a further operation of the pressure responsive device for a further operation of said motor.

9. In a pressure regulator comprising a pressure responsive device and a plurality of fluid pressure motors for controlling the pressure, controlling valves for each of said motors, means operated by said pressure responsive device for controlling the operation of said controlling valves, and means operated by each of said motors for rendering its respective controlling valve inoperative and to cause a further operation of the pressure responsive device for a further operation of said motor.

JAMES L. KIMBALL.